(12) United States Patent
Hyun

(10) Patent No.: US 10,003,950 B2
(45) Date of Patent: Jun. 19, 2018

(54) ID KITS FOR PERSONAL AUTOMATION, AND CHARGING UNITS THEREFOR

(71) Applicant: KOCOM CO., LTD., Bucheon-si, Gyeonggi-do (KR)

(72) Inventor: Jae-ho Hyun, Gimpo-si (KR)

(73) Assignee: KOCOM CO., LTD., Bucheon-si, Gyeonggi-do (KR)

(*) Notice: Subject to any disclaimer, the term of this patent is extended or adjusted under 35 U.S.C. 154(b) by 0 days. days.

(21) Appl. No.: 15/316,497

(22) PCT Filed: Jun. 3, 2015

(86) PCT No.: PCT/KR2015/005570
§ 371 (c)(1),
(2) Date: Dec. 5, 2016

(87) PCT Pub. No.: WO2015/186966
PCT Pub. Date: Dec. 10, 2015

(65) Prior Publication Data
US 2017/0156023 A1    Jun. 1, 2017

(30) Foreign Application Priority Data
Jun. 3, 2014  (KR) .................. 10-2014-0067671

(51) Int. Cl.
*H04W 76/00* (2018.01)
*H04W 4/00* (2018.01)
(Continued)

(52) U.S. Cl.
CPC .............. *H04W 4/80* (2018.02); *G01P 15/18* (2013.01); *G10L 19/00* (2013.01); *H02J 7/0027* (2013.01);
(Continued)

(58) Field of Classification Search
CPC ..... H04W 12/06; H04W 4/008; H04W 36/00; H04W 76/023; H04M 1/02; H02J 7/0027;
(Continued)

(56) References Cited

U.S. PATENT DOCUMENTS 7,885,645 B2 * 2/2011 Postma ............... H04M 1/02
379/211.01
9,087,246 B1 * 7/2015 Chin .................. H04W 4/008
(Continued)

FOREIGN PATENT DOCUMENTS

JP    2007-150904 A    6/2007
JP    2012-164352 A    8/2012
(Continued)

OTHER PUBLICATIONS

International Search Report for PCT/KR2015/005570 dated Sep. 16, 2015 from Korean Intellectual Property Office.

*Primary Examiner* — Thanh Le
(74) *Attorney, Agent, or Firm* — Revolution IP, PLLC

(57) ABSTRACT

An ID kits for personal automation comprise: a wireless communication module for performing wireless communication with an external wireless communication device; a microcomputer for performing an operation according to a program configured according to a signal of the wireless communication device via the wireless communication and outputting the result of the performance to the wireless communication module; and a first battery for supplying power to the microcomputer, wherein each ID kit is given a unique number, which is then registered with only one wireless communication device, and thus can wirelessly communicate only with the registered wireless communication device.

19 Claims, 12 Drawing Sheets

(51) Int. Cl.
*H02J 7/00* (2006.01)
*H04W 76/02* (2009.01)
*G10L 19/00* (2013.01)
*G01P 15/18* (2013.01)
*H04L 29/12* (2006.01)

(52) U.S. Cl.
CPC ........... *H02J 7/0045* (2013.01); *H04W 4/008* (2013.01); *H04W 76/023* (2013.01); *H04W 76/14* (2018.02); *H04L 61/6022* (2013.01)

(58) Field of Classification Search
CPC ........ H02J 7/0045; G10L 19/00; G01P 15/18; H04L 61/6022; H04L 63/0876; H04L 63/083
See application file for complete search history.

(56) References Cited

U.S. PATENT DOCUMENTS

2008/0016368 A1* 1/2008 Adams .................. H04W 12/06
713/183
2008/0316042 A1 12/2008 Scales
2016/0182145 A1* 6/2016 Shi ........................ H04W 36/00
455/436

FOREIGN PATENT DOCUMENTS

KR 10-0579699 B1 5/2006
KR 10-0608518 B1 8/2006

\* cited by examiner

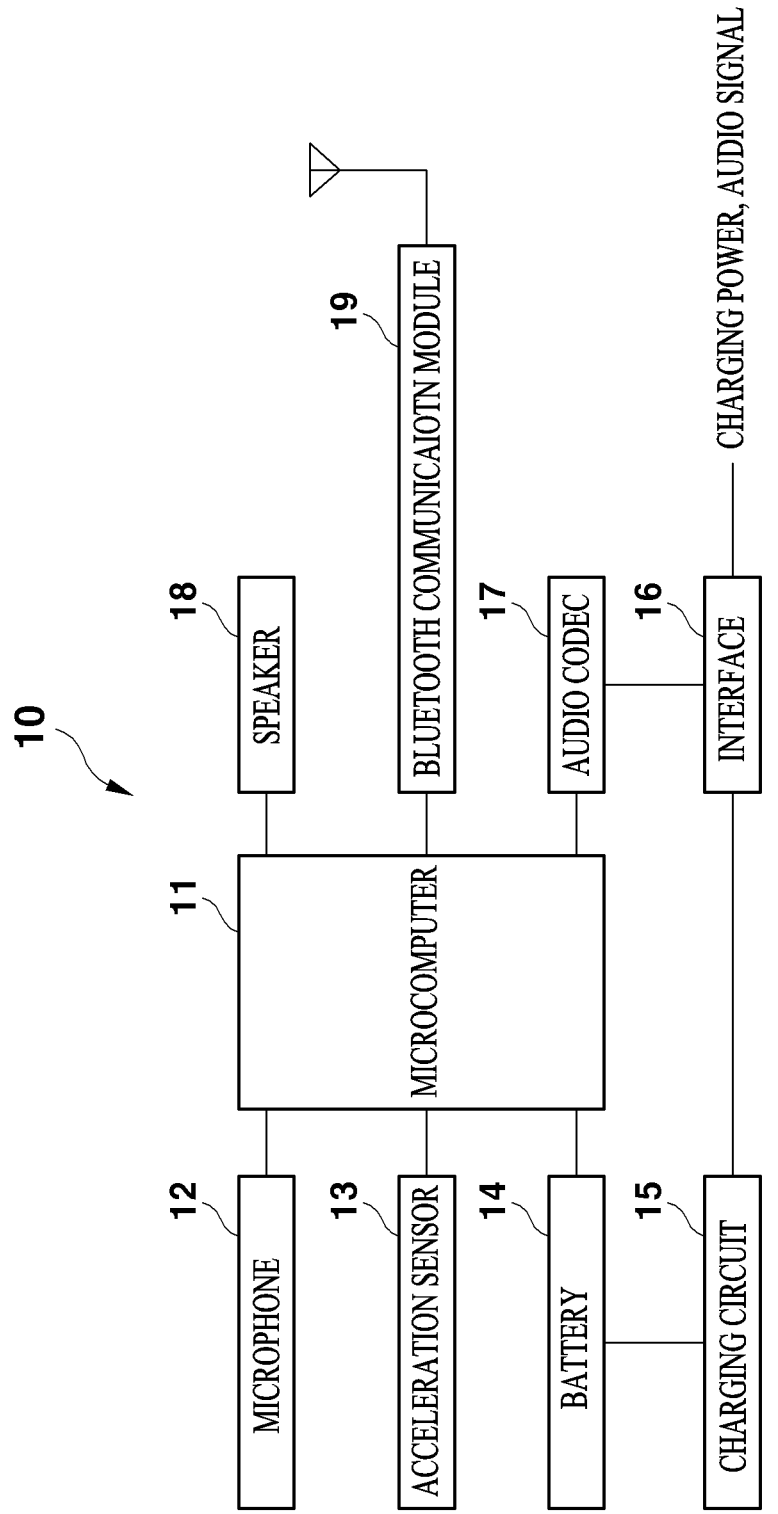
[FIG. 1]

[FIG. 2]
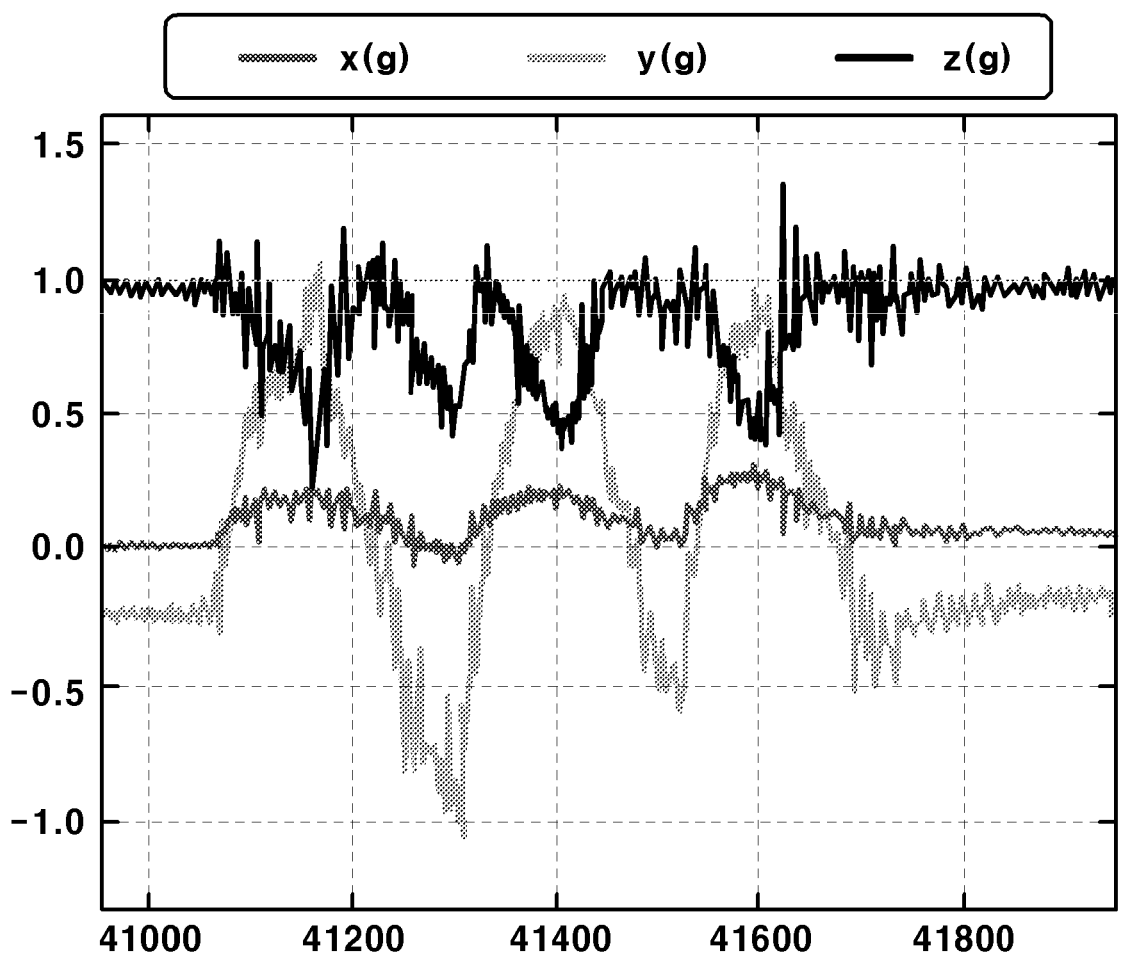

[FIG. 3a]
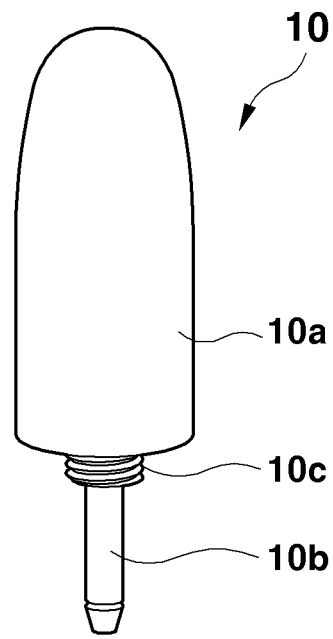
[FIG. 3b]
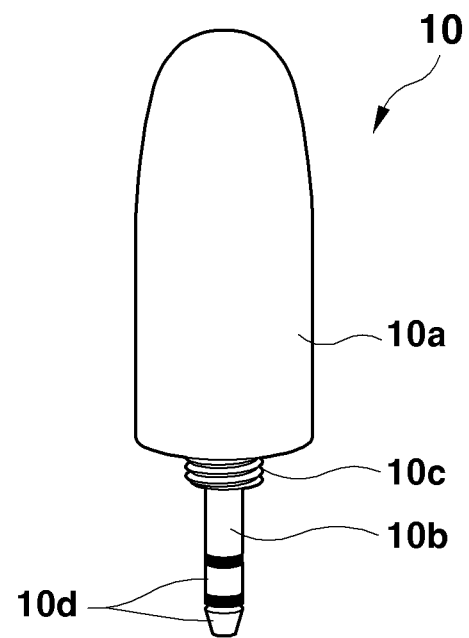

[FIG. 4a]
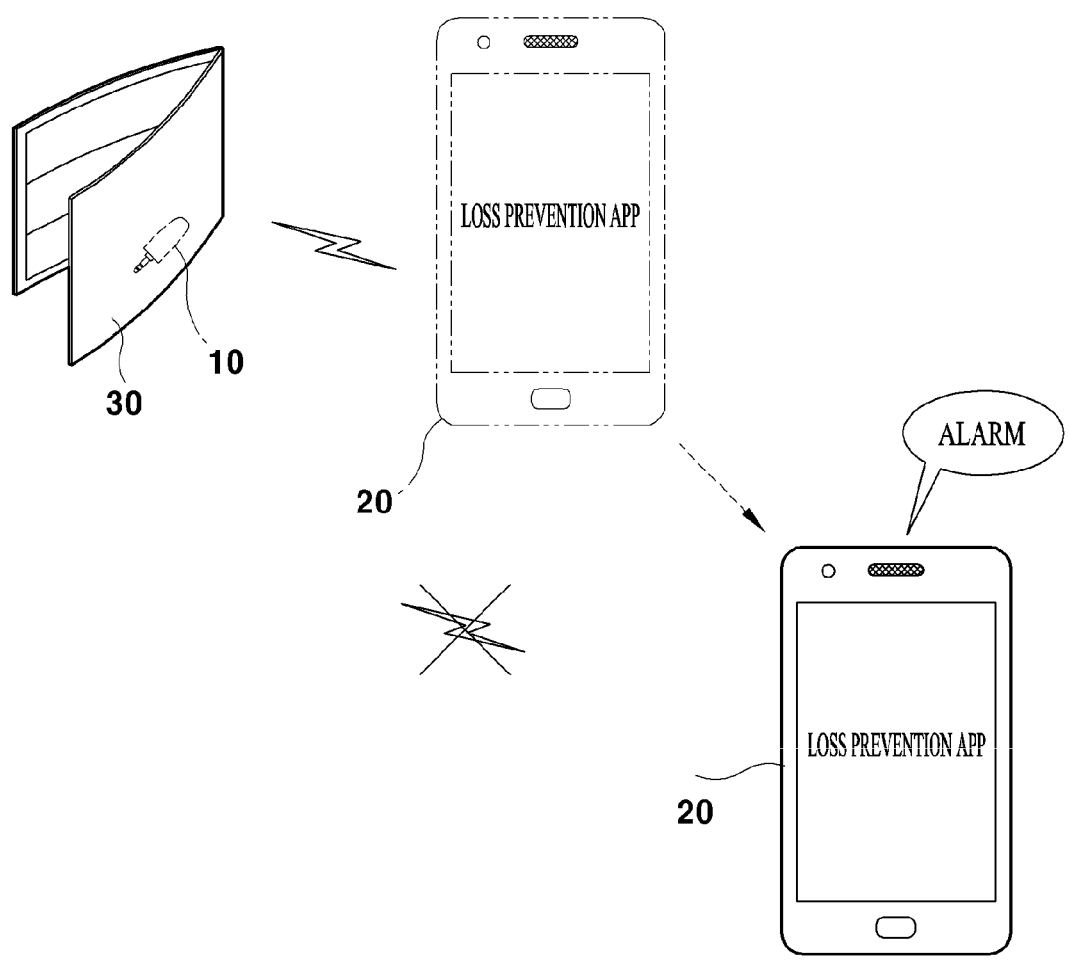

[FIG. 4b]
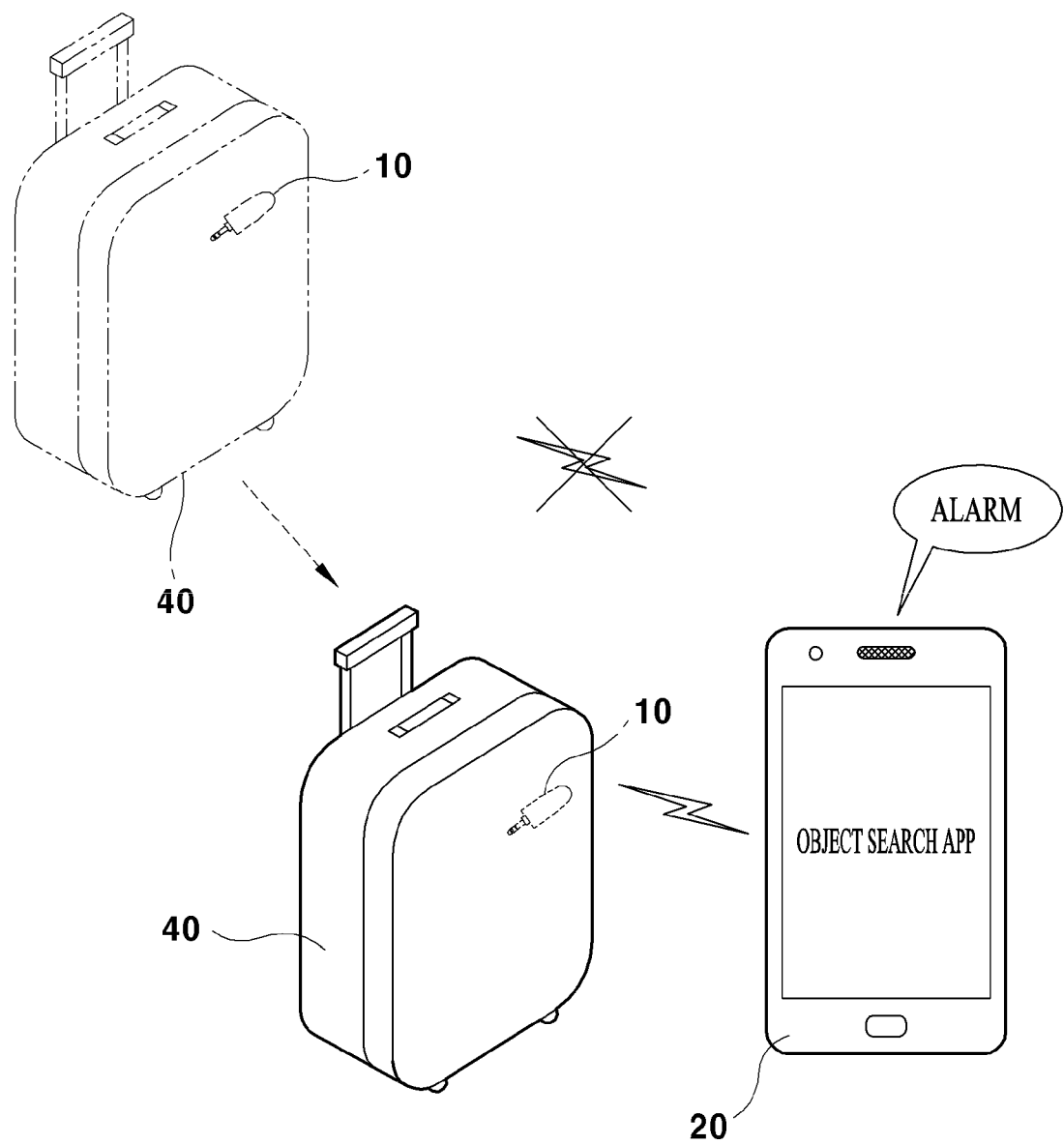

【FIG. 5a】
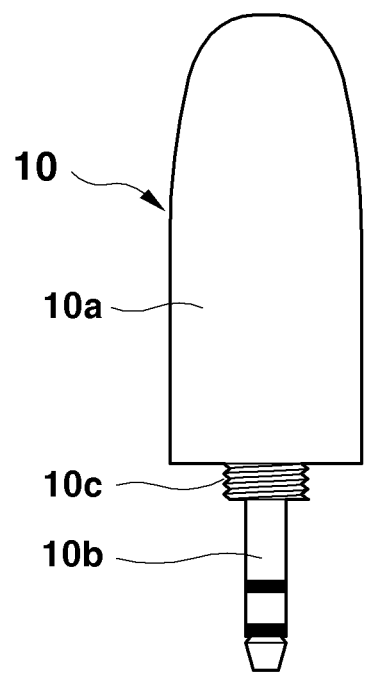
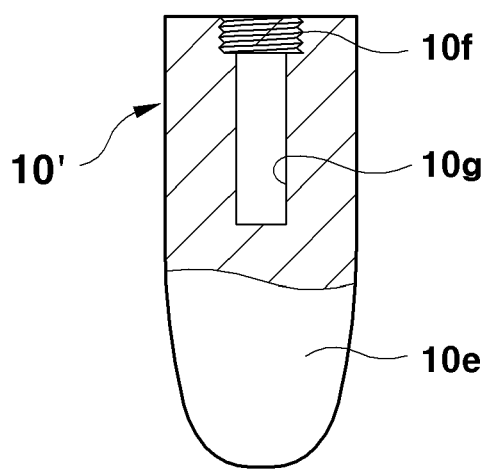

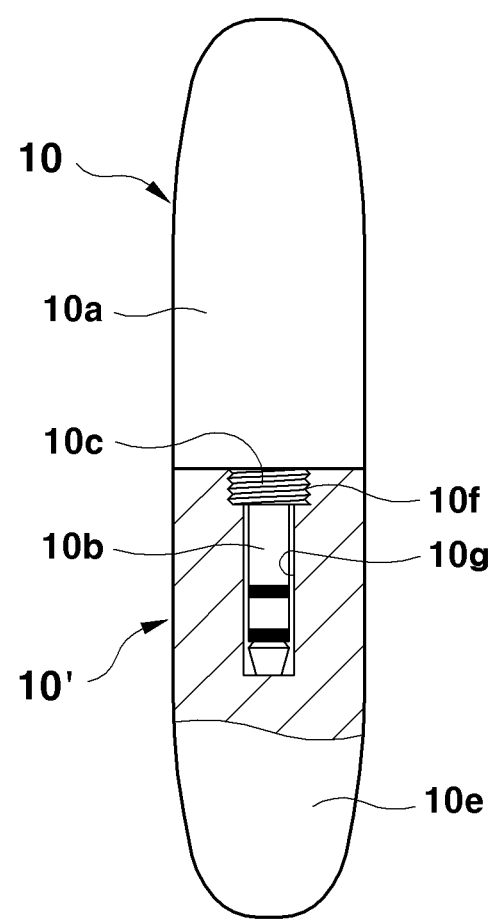

[FIG. 6a]
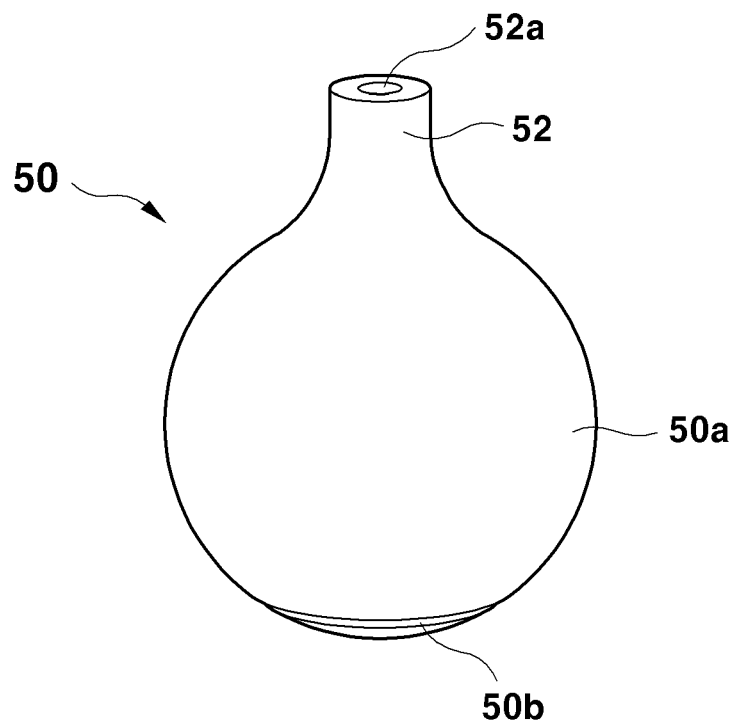

[FIG. 6b]
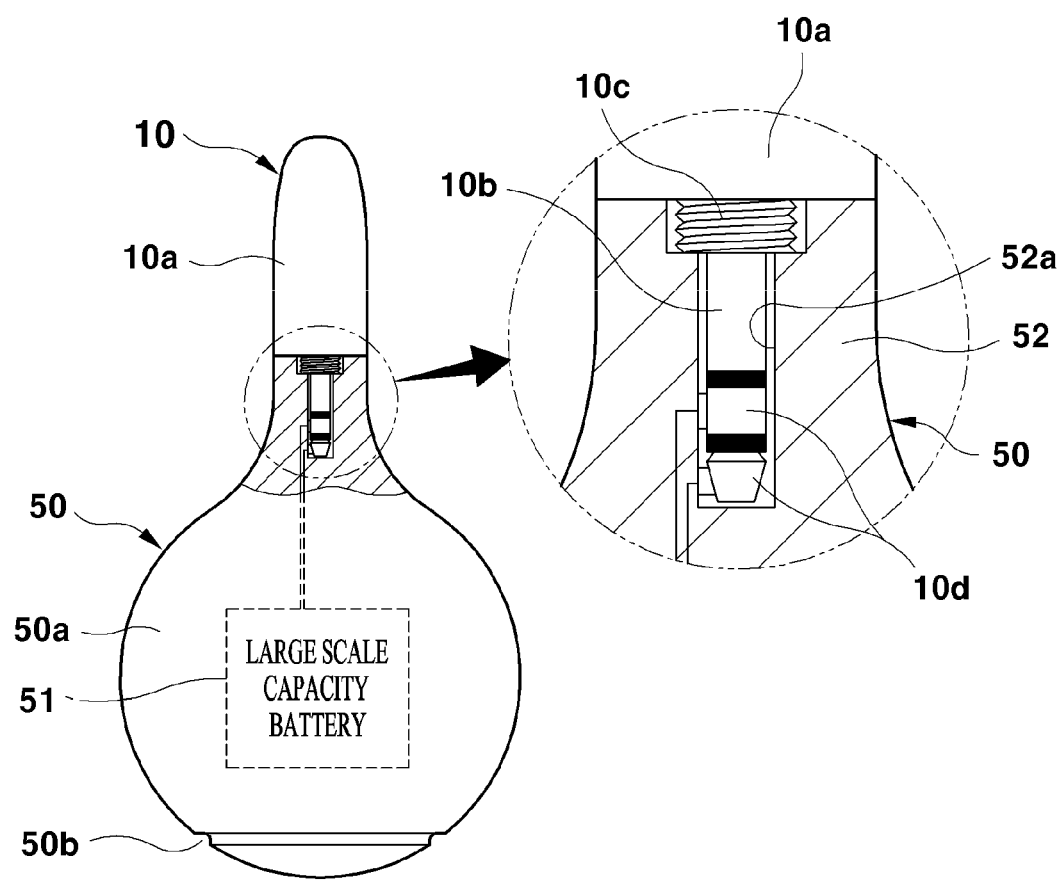

【FIG. 7a】
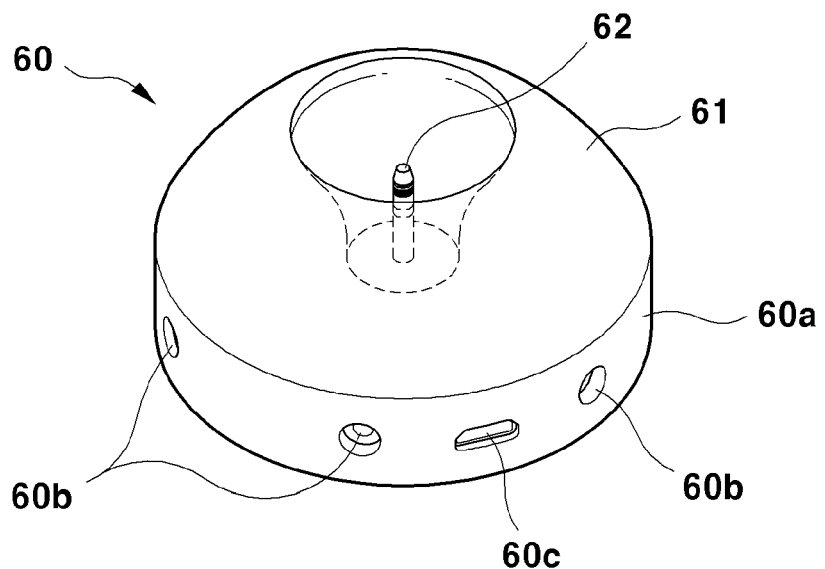
【FIG. 7b】
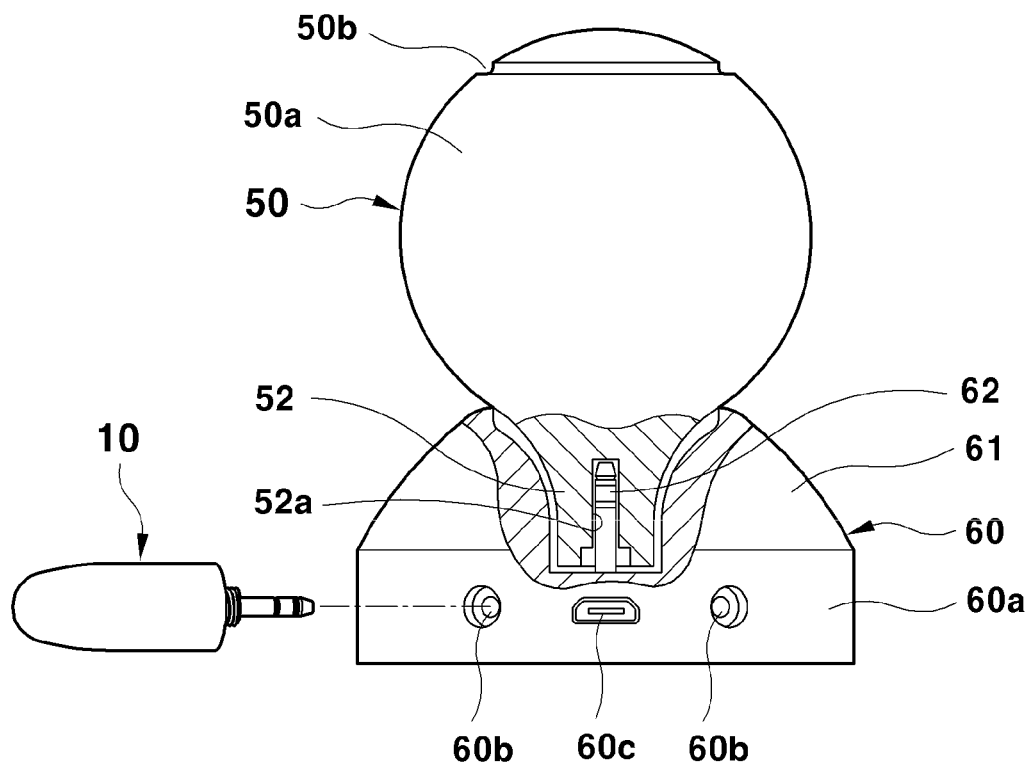

【FIG. 7c】
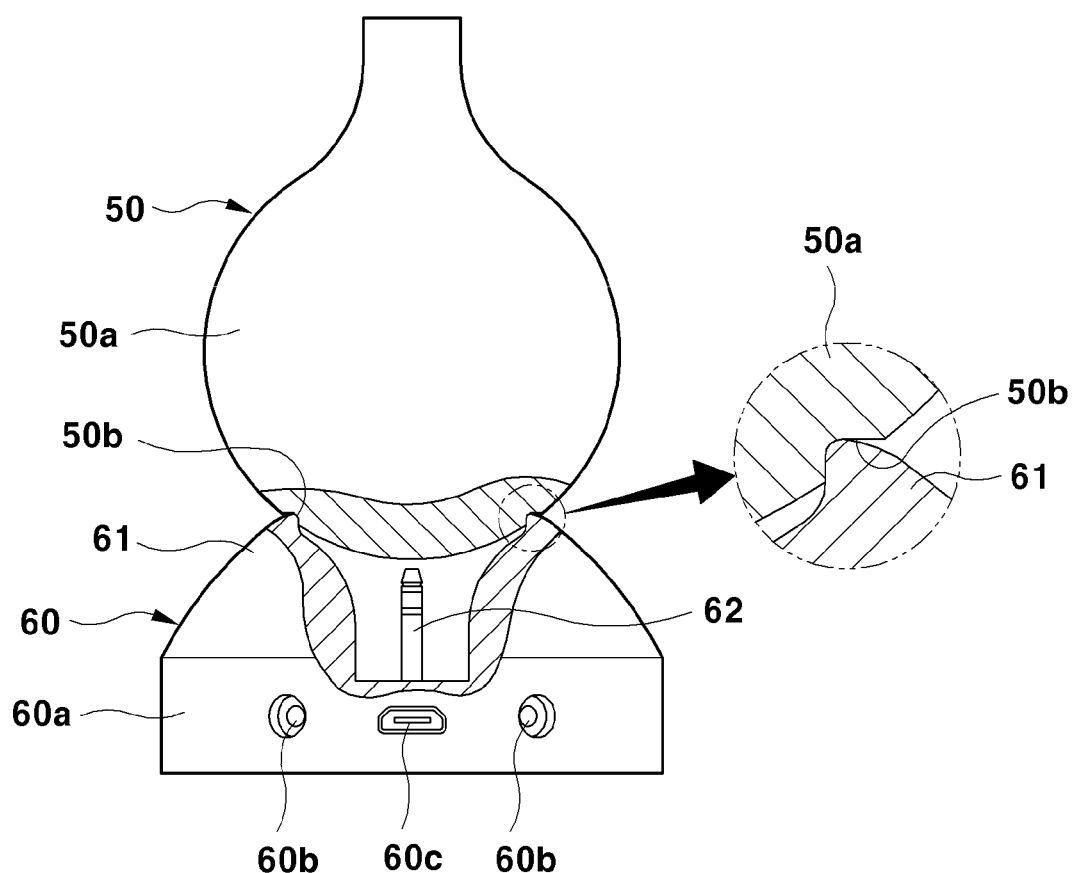

[FIG. 8]
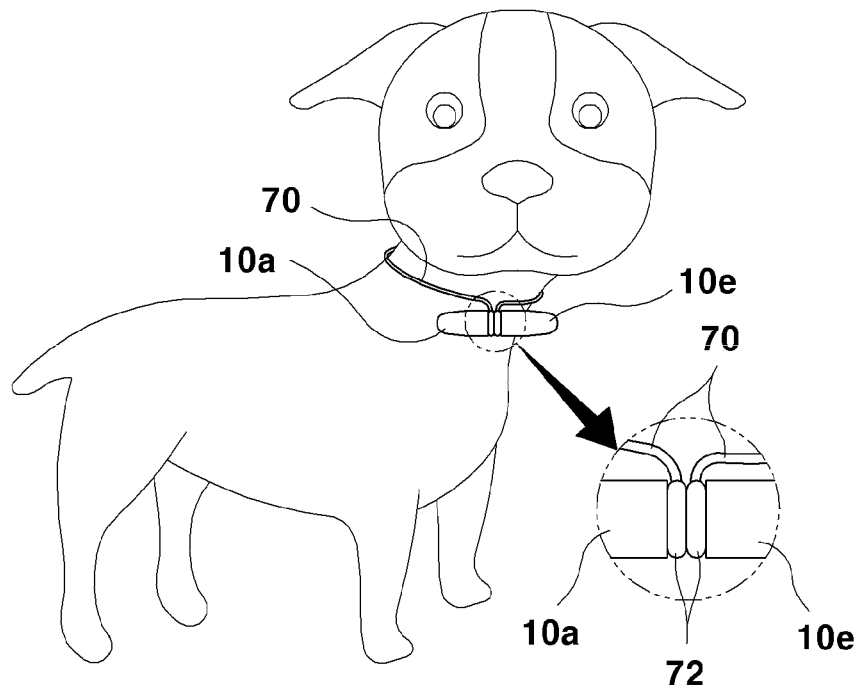
[FIG. 9]
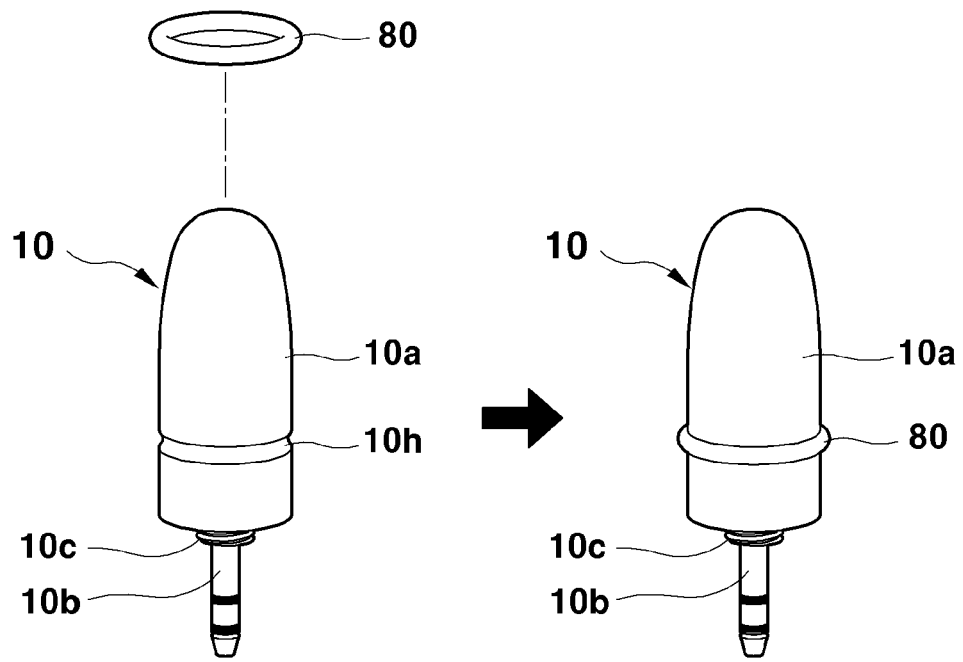

ID KITS FOR PERSONAL AUTOMATION, AND CHARGING UNITS THEREFOR

TECHNICAL FIELD

The present invention relates to an ID kit for personal automation and charging units therefor, and more particularly, to an ID kit enabling an ID kit that performs wireless communication, for example, Bluetooth communication with a wireless communication device such as a smartphone to be widely used for personal automation by including an acceleration sensor and an audio codec, and a unit for charging the ID kit.

BACKGROUND ART

Recently, factory automation, office automation, and home automation, etc. are being achieved by automation in which a device or machine, etc. moves or works for itself without depending on a human.

Among them, the factory automation (FA) automates jobs in a factory using a computer, and aims not only to automate product manufacturing such as design, assembling, processing, and factory control for a product by machine including the computer or a robot, but also to rationalize a circulation system for an order, production, and supply, etc. where a factory, each department in a company, and related companies are connected by an information communication system.

The office automation (OA) automates jobs done in an office such as writing, storage, and delivery of a document using a computer or a facsimile.

The home automation (HA) attempts to create a pleasant living environment by furnishing electronic technology and a microcomputer to all aspects of home life, and aims not only for efficiency of home life such energy saving, but also for safety and convenience in such as crime prevention, visual communication, and home banking.

The factory automation means pure automation, the office automation means convenience, and home informatization means information and security.

On the other hand, out of such automation in a specific place, as a smartphone is diffused, it is anticipated that a personal automation age will arrive in the future.

This personal automation is automation in personal life or jobs, etc., and aims for automation proper to personal lifestyle or a situation in which an individual encounters.

Such personal automation is a concept of not only pure automation, convenience, information, and security, but also relief (safety) added to elementary concerns of humans.

For example, another meaning of the personal automation is to get out of minute concerns about robbery or loss of personal belongings such as an umbrella, shoes, a book, a handbag, diary, and a bag or losing a child, a pet dog, or a dotard, and to mellow out personal life.

Therefore, a separate device is required to enable propagation of such personal automation to be cheaply realized by interaction with a typical smartphone through wireless communication.

DISCLOSURE

Technical Problem

The present invention provides an ID kit for personal automation capable of cheaply realizing personal automation that enables personal life to mellow out with convenience and relief by the ID kit that interworks with a smartphone through, for example, Bluetooth communication.

Technical Solution

According to an embodiment of the present invention, an ID kit for personal automation includes: a wireless communication module performing wireless communication with an external wireless communication device;
a microcomputer performing an operation as programmed according to a signal from the wireless communication device through the wireless communication and outputting a performed result to the wireless communication module; and
a first battery supplying power to the microcomputer,
wherein one of given unique numbers is registered to only one wireless communication device, and wireless communication is enabled with the registered wireless communication device.

According to another embodiment of the present invention, an ID kit charging unit for personal automation includes: a kit main body provided with the Bluetooth communication module, the microcomputer, the first battery, the acceleration sensor, the microphone and speaker, the audio codec, the charging circuit and the interface;
a terminal formed protruding from one side portion of the kit main body and having an electrode thereon; and
a male screw unit formed to have a larger diameter than the terminal on an outer circumferential surface of the terminal at a position adjacent to the kit main body,
wherein a mobile charger is provided which enables charging while the ID kit is carried and in which a second battery of which capacity is larger than that of the first battery of the ID kit is embedded, and a charging terminal groove is formed in a first charger main body so as to be electrically connected to the second battery and to correspond to a terminal having the electrode formed thereon.

Advantageous Effects

According to the technical solution, personal automation may be cheaply realized which mellows out with convenience and relief by the ID kit that interworks with a smartphone through Bluetooth communication.

In addition, according to the present invention, the ID kit may be attached to a personal belonging, a person, or an animal, etc. and may be attached/unattached in an insertion/separation way, or in a necklace way. In addition, with only one ID kit, regardless of the subject, the ID kit may be attached to the subject and used in various ways only by changing an app installed in the smartphone, and may be used by changing the subject.

In addition, according to the present invention, with one ID kit, by changing only an app installed in the smartphone, usage of the ID kit may be extended infinitely not only to prevention of robbery or loss of personal belongings, or of a missing child but also to object search, health maintenance according to pattern recognition, posture correction, a locking device through double or triple authentication such as a shared locker (parcel service box) or a safe-deposit box, or a smartphone as a substitute for a videophone in a home network system.

DESCRIPTION OF DRAWINGS

FIG. 1 is a configuration diagram of an ID kit according to an embodiment of the present invention.

FIG. 2 is a graph for explaining a function of the acceleration sensor illustrated in FIG. 1.

FIG. 3a and FIG. 3b are perspective views of the ID kit according to an embodiment of the present invention.

FIG. 4a and FIG. 4b are views for explaining exemplary personal automation using the ID kit illustrated in FIG. 3.

FIG. 5a and FIG. 5b are a front view before assembling and a front sectional view after assembling the ID kit and the protection cap illustrated in FIG. 3.

FIG. 6a and FIG. 6b are a perspective view and a charged state sectional view of a mobile charger for charging the ID kit illustrated in FIG. 3b.

FIG. 7a to FIG. 7c are a perspective view and usage state views of a stationary charger for charging an ID kit and a mobile charger according to an embodiment of the present invention.

FIG. 8 is a view illustrating a usage example of the assembled ID kit illustrated in FIG. 5.

FIG. 9 is a perspective view of an ID kit according to another embodiment of the present invention.

MODE OF THE INVENTION

Hereinafter configurations and operations of embodiments of the present invention will be described with accompanying drawings.

Herein, the same reference numerals are given to the same or corresponding elements, although they are illustrated in different drawings In the following description, detailed descriptions of well-known functions or constructions will be omitted since they would obscure the invention in unnecessary detail.

In addition, when an element is referred to as "comprising" or "including" a component, it does not preclude another component but may further include the other component unless the context clearly indicates otherwise.

FIG. 1 is a configuration diagram of an ID kit according to an embodiment of the present invention.

As illustrated in FIG. 1, an ID kit 10 is basically provided with a microcomputer 11, a battery 14, and a Bluetooth communication module 19, and further provided with a microphone 12, an acceleration sensor 13, a charging circuit 15, a speaker 18, an audio codec 17, and an interface 16.

For the ID kit 10, a unique number is given to each ID kit and the unique number is registered to only one wireless communication device (e.g. a smartphone).

Here, the unique number is an MAC address allocated by a manufacturer at the time of manufacturing the ID kit.

Accordingly, since wireless communication is possible only with the corresponding smartphone and Bluetooth communication is not possible with all other smartphones that are not registered, this ID kit is not available to another person who takes it away.

The battery 14 supplies power to the microcomputer of the ID kit 10 and may be a secondary battery reusable by charging, and to this end, the charging circuit 15 is necessary.

The charging circuit 15 receives external power through the interface 16 and charges the battery 14 that is the secondary battery.

The Bluetooth communication module 19 is a component for performing Bluetooth communication with a smartphone, receives a signal of the smartphone to transfer the signal to the microcomputer, and transmits a signal from the microcomputer to the smartphone.

The microcomputer 11 operates according to an initially set program in using various input/outputs, receives a command from the smartphone through Bluetooth communication to perform an operation according to the command, and controls each component.

For example, the microcomputer executes a received command such as 'Receive an analog signal and transmit the analog signal to a smartphone through a Bluetooth communication module', 'Read an acceleration sensor value and transmit the value, as it is, to the smartphone through the Bluetooth communication module', 'Convert a value received through the Bluetooth communication module to an analog signal and output the analog signal', or 'Convert a value received through the Bluetooth communication module to an analog signal and output the analog signal through the speaker'.

The microphone 12 receives an external analog audio signal, and a speaker outputs the analog audio signal externally.

The interface 16 receives charging power for charging the battery 14 from the outside, transmits an inside audio signal to an external device, and receives an audio signal from the external device to the inside.

In other words, the interface 16 receives the charging power and inputs/outputs the audio signal.

The audio codec 17 converts an analog audio signal to a digital signal, while compressing data to perform encoding for use in communication, and on the contrary, converts a digital audio signal to an analog signal, while decompressing the compressed data to perform decoding.

For example, the audio codec 17 converts, to a digital signal, an analog audio signal received through the microphone 12 or through the interface and delivers the digital signal to the microcomputer 11, and converts, to an analog signal, a digital audio signal received through the Bluetooth communication module 19 and outputs the analog signal to the speaker 18.

The acceleration sensor 13 senses a change (movement) amount in 3-axis directions of X, Y, and Z and transmits the change amount to the microcomputer 11 through I2C communication.

The change amount is a concept of coordinate values, and a movement change on each axis is digitized and continuously received, the digitized value being as shown in FIG. 2.

In FIG. 2, it may be known that there are movements three times identically in X and Y axis directions, but a more movement occurs in the Y-axis direction and a continuous movement occurs in the Z-axis direction.

A movement pattern may be known by checking such a flow change and when the ID kit 10 is attached to, for example, a shoe of a pedestrian, a movement pattern may be recognized at the time of walking, and walking posture may be corrected.

FIG. 3a and FIG. 3b are perspective views of an ID kit according to an embodiment of the present invention.

As illustrated in FIG. 3a, in an embodiment, a terminal 10b protrudes from a kit main body 10a to form one body with the kit main body 10a and a male screw unit 10c is formed to have a larger diameter than the terminal 10b on an outer circumferential surface of the terminal adjacent to the kit main body 10a.

At this point, the microcomputer 11, the battery 14, and the Bluetooth communication module 19 from among the components illustrated in FIG. 1 are embedded in the kit main body 10a.

The kit main body 10a has a cylinder shape but an upper portion thereof is spherically rounded to facilitate insertion and the terminal 10b is formed to be one body with the kit main body 10a in a lower portion thereof.

As illustrated in FIG. 3b, in another embodiment, a terminal protruded from the kit main body to form one body with the kit main body 10a, the male screw unit 10c is formed to have a larger diameter than the terminal 10b on the outer circumferential surface of the terminal adjacent to the kit main body 10a, and an electrode 10d is formed for charging power and an audio signal on a terminal 10b therebelow.

At this point, the entire components illustrated in FIG. 1 are provided in the kit main body 10a and among them, a function of the interface 16 is realized by the terminal 10b on which the electrode 10d is formed.

The kit main body 10a has a cylinder shape but an upper portion thereof is spherically rounded to facilitate insertion and the terminal 10b is formed to be one body with the kit main body 10a in a lower portion thereof.

FIG. 4a and FIG. 4b are views for explaining exemplary personal automation using the ID kit illustrated in FIG. 3.

In FIG. 4a, a loss prevention app for alarming at the time when the Bluetooth communication is cut off from a specific ID kit 10 to which a unique number is given is installed in a smartphone 20 having a Bluetooth communication function, and when the corresponding specific kit 10 is attached to a personal belonging, for example, a wallet 30 and the smartphone 20 is close to the ID kit 10, the Bluetooth communication is enabled and the alarm does not ring in the smartphone 10.

When an owner of the smartphone 20 moves without carrying the wallet 20 and is a prescribed distance away from the ID kit, the Bluetooth communication between the ID kit 10 and the smartphone 20 is cut off and at this point, the alarm in the smartphone 20 rings.

Through this, the wallet owner may check that he/she does not carry the wallet 30.

In FIG. 4b, an object search app for alarming at the time when the Bluetooth communication is connected with a specific ID kit 10 to which a unique number is given is installed in a smartphone 20 having a Bluetooth communication function, and when the corresponding specific kit 10 is attached to, for example, a plane luggage 40, and the plane luggage 40 is loaded into the plane and is claimed by an owner of the plane luggage 40 after being unloaded from the plane, the Bluetooth communication is not possible at first and the alarm does not ring since the smartphone 20 is a distance away from the ID kit 10.

However, when the plane luggage 40 is carried on the carousel and close to the owner (i.e. smartphone) who desires to claim the luggage, the ID kit 10 and the smartphone 20 perform a paring process and Bluetooth communication and at this point the alarm rings in the smartphone 20.

Through this, the luggage owner may know the luggage to be close to him/her and easily claim the luggage.

FIG. 5a and FIG. 5b are a front view before assembling and a front sectional view after assembling the ID kit and the protection cap illustrated in FIG. 3.

As illustrated in FIG. 5a, the kit main body 10a of the ID kit 10 and a cap main body 10e of a protection cap 10' have shapes symmetric to each other but a terminal groove 10g and a female screw unit 10f are formed in the cap main body 10e in order to correspond to the terminal 10b and the male screw unit 10c of the ID kit 10.

Accordingly, after the terminal 10b is inserted into the terminal groove 10g, when the male screw unit 10c and the female screw unit 10b are combined as shown in FIG. 5b, the ID kit 10 and the protection cap 10' are combined to form a cylinder shape (a medicine capsule shape) of which an upper portion and a lower portion are spherically rounded.

FIG. 6a and FIG. 6b are a perspective view and a charged state sectional view of a mobile charger for charging the ID kit illustrated in FIG. 3b.

The mobile charger 50, in which a large storage capacity battery 51 of which a storage capacity is larger than that of the battery 14 of the ID kit 10 is embedded, is carried for charging the ID kit 10.

A charger main body 50a of the mobile charger 50 has approximately a light bulb shape of which an upper portion of a sphere shape has a protruding unit 52 formed thereon and a lower portion thereof is made weighty in order to have a roly-poly function that gets up again even if it is rolled roughly.

The protruding unit 52 of the charger main body 50a is formed to have the same diameter as that of the kit main body 10a, and a charging terminal groove 52a is formed, on the protruding unit 52, to correspond to the terminal 10b on which the electrode 10d of the ID kit 10 is formed.

Here, an electrode (not illustrated) is formed which contacts the electrode 10d of the ID kit 10 on the lower inner circumferential surface of the protruding unit 52 on which the charging terminal groove 52a is formed and this electrode is connected to the large storage capacity battery 51.

In addition, although not illustrated in the drawings, like the female screw unit 10f of the protection cap 10', a female screw unit may be further formed on an inner circumferential surface of the upper portion of the protruding unit 52 formed in the charging terminal groove 52a.

In order not to move at the time of being stationed, a stationary groove 50b is formed on the stationary charger 60 to be described later along the outer circumferential surface in the central-lower portion of the charger main body 50a.

Accordingly, the terminal 10b of the ID kit 10 is inserted to the charging terminal groove 52a of the mobile charger 50 to charge the battery 14 of the ID kit 10 as shown in FIG. 6b.

In this way, when the ID kit 10 is combined with the mobile charger 50 and made to be stood, the ID kit 10 combined with the upper portion is greatly moved even by a small shock and this movement is sensed by the acceleration sensor 13.

Using this, even if the charger main body 50a is put on a specific object, for example, on a book and a user is away, an app may be realized to ring an alarm when a movement change amount of the ID kit 10 is large, and the book may be prevented from being lost.

FIG. 7a to FIG. 7c are a perspective view and use state views of a stationary charger for charging an ID kit and a mobile charger according to an embodiment of the present invention.

As illustrated in FIG. 7a, the charger main body 60a of the stationary charger 60 has a cylinder shape of which a lower portion is closed and an upper portion is open and a mounting unit 61 of a cylinder shape is formed on the upper portion, a charging terminal 62 for charging the mobile charger 50 is formed to protrude toward the upper portion at the center of the lower portion having a prescribed thickness.

At this point, the height of the charging terminal is formed lower than that of the stationary unit 61 and an end portion of the mounting unit 61 is formed thinner than the thickness of the mounting unit 61 in order for a mounting groove 50b of the mobile charger 50 to be inserted therein.

In addition, a plurality of charging ports 60b in which terminals 10b of the ID kit 10 are inserted and a power supply port 60c to which charging power is applied externally are formed on the outer circumferential surface of the charger main body 60a.

A power distribution means (not illustrated) for supplying charging power, which is supplied through the power supply port 60c, to the charging terminal 62 and the plurality of charging ports 60b is formed in the mounting charger 60.

In such a configuration, as illustrated in FIG. 7b, a plurality of ID kits 10 may be charged by putting the terminals 10b of the ID kits 10 in the charging ports 60b of the mounting charger 60, and the mobile charger 50 may be charged by reversing the mobile charger 50 and inserting the charging terminal 62 into the charging terminal groove 52b.

In addition, when the mobile charger 50 is not charged, the mobile charger 50 may be stably mounted by holding the mobile charger 50 rightly and positioning the mounting groove 50b of the charger main body 50a at an upper portion of the mounting unit 61, which is formed thin.

FIG. 8 is a view illustrating a usage example of the assembled ID kit illustrated in FIG. 5.

As illustrated in FIG. 8, when a hook ring 72 is connected between both ends of a loop string 70 and the protection cap 10 is assembled with the hook ring 72 inserted in the terminal 10b of the ID kit 10, the ID kit 10 may be put around, for example, the neck of a pet dog or a child using the loop string 70 or the loop string 70 may be made of an elastic material such as a rubber to be put around the arm or foot.

FIG. 9 is a perspective view of an ID kit according to another embodiment of the present invention.

The terminal 10b is formed to be one body to protrude from the kit main body 10a and a male screw unit 10c having a larger diameter than that of the terminal 10b is formed on the terminal 10b adjacent to the kit main body 10a.

At this point, a portion (the microcomputer, the battery, and the Bluetooth communication module) or the entirety of the components illustrated in FIG. 1 is provided to the kit main body 10a.

The kit main body 10a has a cylinder shape but an upper portion thereof is spherically rounded to facilitate insertion and the terminal 10b is formed to be one unit with the kit main body 10a on a lower portion thereof.

In addition, an electrode for charging or inputting/outputting an audio signal may be or may not be formed in the terminal 10b.

A ring-shaped groove 10h is formed on the outer circumferential surface of the kit main body 10a and a color ring 80 having elasticity like a rubber is put on the kit main body 10a to be positioned in the ring-shaped groove 10h.

At this point, if needed, a user may change the color of the color ring 80 and put it on the kit main body 10a to show cheap and various color directions.

Although the technical spirit of the present invention has been described with the accompanying drawings, it should be considered illustrative, and not restrictive. In addition, those skilled in the art will appreciate that various modifications, additions and substitutions are possible, without departing from the scope and the spirit of the invention as disclosed in the accompanying claims.

The invention claimed is:

1. An ID kit for personal automation comprising:
   a wireless communication module performing wireless communication with a wireless communication device;
   a microcomputer performing an operation as programmed according to a signal from the wireless communication device through the wireless communication and outputting a performed result to the wireless communication module; and
   a first battery supplying power to the microcomputer,
   wherein one of given unique numbers is registered to only one wireless communication device, and wireless communication is enabled with the registered wireless communication device.

2. The ID kit for personal automation according to claim 1, wherein the wireless communication device is a Bluetooth communication device, and the wireless communication module is a Bluetooth communication module Bluetooth-communicating with the Bluetooth communication device.

3. The ID kit for personal automation according to claim 2, comprising
   a kit main body provided with the Bluetooth communication module, the microcomputer, and the first battery;
   a terminal formed protruding on one side portion of the kit main body;
   a male screw unit formed to have a larger diameter than the terminal on an outer circumferential surface of the terminal at a position adjacent to the kit main body.

4. The ID kit for personal automation according to 3, further comprising:
   an acceleration sensor continuously sensing an amount of change (movement) of the kit main body of the ID kit in three directions of X, Y, and Z to transmit the sensed change amount to the microcomputer through I2C communication.

5. The ID kit for personal automation according to 4, further comprising:
   a microphone receiving an external analog audio signal and a speaker outputting externally an analog audio signal;
   an audio codec digitalizing and encoding the analog audio signal, and decoding and converting a digital signal to an analog signal;
   a charging circuit charging the first battery; and
   an interface receiving charging power of the first battery and inputting/outputting an audio signal of an external audio device.

6. The ID kit for personal automation according to claim 2, comprising:
   a kit main body provided with the Bluetooth communication module, the microcomputer, the first battery, the acceleration sensor, the microphone and speaker, the audio codec, the charging circuit and the interface;
   a terminal formed protruding from one side portion of the kit main body and having an electrode thereon; and
   a male screw unit formed to have a larger diameter than the terminal on an outer circumferential surface of the terminal at a position adjacent to the kit main body.

7. The ID kit for personal automation according to claim 6, wherein the terminal with the electrode formed thereon functions as an interface.

8. The ID kit for personal automation according to claim 3, comprising: a protection cap having a cap main boy in which a terminal groove and a female screw unit are formed respectively corresponding to the terminal and male screw unit of the ID kit and are screw-combined with the kit main body.

9. The ID kit for personal automation according to claim 8, wherein a pair of hook rings are put on a terminal between the kit main body and the cap main body and both ends of a loop string is connected to the hook ring.

10. The ID kit for personal automation according to claim 9, wherein the loop string is elastic.

11. The ID kit for personal automation according to claim 3, wherein a ring-shaped groove is formed on the outer circumferential surface of the kit main body and an elastic color ring is put thereon.

12. The ID kit for personal automation according to claim 3, wherein the kit main body has a cylinder shape of which another side surface is spherically rounded.

13. The ID kit for personal automation according to claim 1, wherein the unique number is a MAC address allocated by a manufacturer at a time of manufacturing the ID kit.

14. An ID kit charging unit for personal automation for charging the ID kit of claim 6, wherein a mobile charger is provided which enables charging while the ID kit is carried and in which a second battery of which capacity is larger than that of the first battery of the ID kit is embedded, and a charging terminal groove is formed in a first charger main body so as to be electrically connected to the second battery and to correspond to a terminal having the electrode formed thereon.

15. The ID kit charging unit according to claim 14, wherein the main body of the first charger has a protruding unit on an upper portion of a spherical shape and a charging terminal groove is formed on the protruding unit.

16. The ID kit charging unit according to claim 15, wherein a lower portion of the main body of the first charger is weighty to have a roly-poly function.

17. The ID kit charging unit according to claim 14, further comprising:
a stationary charger formed of a main body of a second charger of a cylindrical shape of which a lower portion having a prescribed thickness is closed and an upper portion is open and a charging terminal is formed protruding toward the upper portion at a center of the lower portion having the prescribed thickness such that the main body of the first charger is reversed to enable the second battery to be charged.

18. The ID kit charging unit according to claim of claim 17, wherein a plurality of charging ports enabling the terminal having the electrode of the ID kit formed thereon to be inserted to charge, and a power supply port enabling charging power to be supplied to the charging terminal and the charging ports are formed on an outer circumferential surface of the main body of the second charger.

19. The ID kit charging unit according to claim of claim 17, wherein a mounting groove is formed along the outer circumferential surface on a central-lower portion of the spherical-shaped first charger and the upper portion of the cylinder-shaped main body of the second charger is formed to be narrow so as to be put on the mounting groove at a time of mounting the main body of the first charger on the main body of the second charger.

* * * * *